United States Patent
Yuyama et al.

[19]

[11] Patent Number: 5,832,693
[45] Date of Patent: *Nov. 10, 1998

[54] APPARATUS FOR COLLECTING AMPULES

[75] Inventors: Shoji Yuyama; Hiroshi Nose, both of Toyonaka, Japan

[73] Assignee: Kabushiki Kaisha Yuyama Seisakusho, Toyonaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 785,946

[22] Filed: Jan. 22, 1997

[51] Int. Cl.$^6$ ...................................................... B65B 35/54
[52] U.S. Cl. ................................. 53/168; 53/541; 53/154; 53/155; 53/237; 53/238; 53/52; 53/494; 414/795.3; 221/2; 221/9; 221/17; 364/478.04; 364/479.06; 364/479.14
[58] Field of Search ......................... 364/478.02, 478.03, 364/478.04, 478.07, 478.13, 478.14, 479.01, 479.02, 479.05, 479.06, 479.07, 479.11, 479.12, 479.13, 479.14; 221/1, 2, 6, 8, 9, 10, 11, 17, 94, 95, 112, 113, 119, 121, 123, 124, 132, 133, 287; 53/50, 53, 54, 154, 155, 168, 501, 494, 495, 445, 474, 237, 238, 240, 52, 541; 414/795.3

[56] References Cited

U.S. PATENT DOCUMENTS

| | | |
|---|---|---|
| 3,985,264 | 10/1976 | Shaw et al. .............................. 221/13 X |
| 4,542,808 | 9/1985 | Lloyd et al. .............................. 221/2 X |
| 4,546,901 | 10/1985 | Buttarazzi .................................. 221/10 |
| 5,190,185 | 3/1993 | Blechl .................................. 221/287 X |
| 5,208,762 | 5/1993 | Charhut et al. ......................... 221/9 X |
| 5,431,299 | 7/1995 | Brewer et al. .............................. 221/2 |
| 5,468,110 | 11/1995 | McDonald et al. ............. 364/479.01 X |
| 5,502,944 | 4/1996 | Kraft et al. .............................. 221/2 X |
| 5,597,995 | 1/1997 | Williams et al. .............. 364/478.13 X |

*Primary Examiner*—Daniel Moon
*Attorney, Agent, or Firm*—Wenderoth, Lind & Ponak, L.L.P.

[57] ABSTRACT

A system for collecting prescribed injection ampules. In this system, it is possible to collect any ampules that cannot be collected from an automatic ampule dispenser with high efficiency. An ampule collecting apparatus has a tray supply unit for supplying trays. The trays supplied from the tray supply unit are sent into an ampule dispenser by an elevator unit and a conveyor unit, and moved downward in the dispenser by the downward conveyor unit. While the trays are being fed in the dispenser, ampules are put in the respective trays. The trays then exit the dispenser and stacked by the tray stacker. A drug name list is put in each tray. Of the ampules that are specified in a prescription, those which have not been collected from the ampule dispenser are highlighted on the list. Thus, a pharmacist can instantly see which ampules are not in the tray and can collect the missing ampules from a separate shelf.

1 Claim, 6 Drawing Sheets

FIG. 5A

Check List (prescription)

Patient name _____    Internal department

| | Medicine | Dosage | Number | Medication |
|---|---|---|---|---|
| | Chichina | 50mℓ | 1 | |
| | Gastrobizen | 10mg | 1 | |
| ‡ | Fulmarin | 1g | 1 | |
| | Tobracin | 90mg | 1 | 1/2 dosed |
| ‡ | M.V. 1-3 | 5 mℓ | 1 | |
| | Physiological salt water | 10mℓ | 7 | |
| | Intravenous distilled water | 20mℓ | 4 | |

FIG. 5B

Check List (prescription)

Patient name _____    Internal department

| Medicine | Dosage | Number | Medication |
|---|---|---|---|
| Chichina | 50mℓ | 1 | |
| Gastrobizen | 10mg | 1 | |
| ~~Fulmarin~~ | ~~1g~~ | ~~1~~ | |
| Tobracin | 90mg | 1 | 1/2 dosed |
| ~~M.V. 1-3~~ | ~~5 mℓ~~ | ~~1~~ | |
| Physiological salt water | 10mℓ | 7 | |
| Intravenous distilled water | 20mℓ | 4 | |

FIG. 6A

| Check List (prescription) | | | |
|---|---|---|---|
| Patient name _____ | | | Internal department |
| Medicine | Dosage | Number | Medication |
| Chichina | 50ml | 1 | |
| Gastrobizen | 10mg | 1 | |
| Tobracin | 90mg | 1 | 1/2 dosed |
| Physiological salt water | 10ml | 7 | |
| Intravenous distilled water | 20ml | 4 | |

FIG. 6B

| Check List (prescription) | | | |
|---|---|---|---|
| Patient name _____ | | | Internal department |
| Medicine | Dosage | Number | Medication |
| Fulmarin | 1g | 1 | |
| M.V. 1-3 | 5 ml | 1 | |

APPARATUS FOR COLLECTING AMPULES

BACKGROUND OF THE INVENTION

This invention relates to a method for collecting ampules containing necessary prescribed injections by automatically dispensing some ampules from an ampule container and then by manually collecting other ampules which cannot be collected automatically.

It is said that there are more than 600 kinds of ampuled prescription drugs. Among them, many are rarely used. Such rarely used ampules are stored not in ampule dispensers but in separate shelves. Examined Japanese Utility Model Publication 6-14753 discloses an ampule dispenser which stores only frequently used kinds of ampules and can dispense any necessary one of the kinds stored therein. Such a conventional ampule dispenser can store only about 200 kinds of ampules at the most. That is, the kinds of ampules that cannot be stored in such a dispenser are far greater in number than those stored in the dispenser.

Only ampules stored in an ampule dispenser can be automatically collected, while other ampules have to be collected manually by comparing the collected ampules with check lists during a drug inspection step.

In this step, it is impossible to instantly find out which of the prescribed ampules have already been automatically collected and which are not, because ampules that can be automatically collected and those not are not separated from each other beforehand. Thus, it is necessary to find out by any suitable means which of the prescribed ampules have been automatically collected and to collect the ampules that have not yet been collected from places where they are supposed to be stored.

This work, carried out while inspecting drugs, is troublesome and tends to incur checking and other human errors, which make smooth and quick drug inspection difficult.

An object of this invention is to solve these problems.

SUMMARY OF THE INVENTION

According to this invention, there is provided a method of collecting ampuled drugs comprising collecting predetermined kinds of ampuled drugs by predetermined numbers into a carrier means from an ampule dispenser keeping a plurality of kinds of ampuled drugs based on prescription data, putting a check list into the carrier means while being fed toward an inspection station, the check list carrying names or codes of the drugs collected into the carrier means from the ampule dispenser, and names or codes of other drugs that have not been collected from the ampule dispenser but are specified in the prescription data, the names or codes of the other drugs being highlighted so as to be distinguished from the names or codes of the drugs already in the carrier means, and collecting the drugs whose names or codes are highlighted in the check list into the carrier means.

One way to collect all the ampuled drugs specified in prescriptions prepared by doctors in hospitals is to collect all of such drugs automatically from an ampule dispenser. But for this purpose, the ampule dispenser has to be capable of storing all kinds of ampules, i.e. over 600 kinds of ampules. Such a dispenser would be too bulky and impractical from an economical viewpoint. Thus, instead of collecting all the necessary drugs from an automatic dispenser, drugs that are not needed very often are collected manually from a separate storage place.

According to this invention, names or codes of any ampules that have not been collected from an ampule dispenser are highlighted on the list put in each tray. Thus, a pharmacist can instantly see which of the necessary drugs have been put in the tray and which are not, and collect the missing drugs from a separate shelf. He or she does not have to compare the drug names listed on a prescription with the drugs actually in the tray.

In the alternative, the check list may comprise a first sheet carrying the names or codes of the drugs already in the tray, and a second sheet separate from the first sheet and carrying the names or codes of the drugs not in the tray. In this case, a pharmacist collects the drugs listed on the second sheet.

Other features and objects of the present invention will become apparent from the following description made with reference to the accompanying drawings, in which:

BRIEF DESCRIPTION OF THE DRAWINGS

FIGS. 5A and 5B are examples of check lists; and

FIGS. 6A and 6B are a view of a different check list and a list carrying drug names or codes that have to be collected.

DETAILED DESCRIPTION OF THE PREFERRED EMBODIMENT

The embodiment of this invention is now described with reference to the accompanying drawings.

Figure 1:
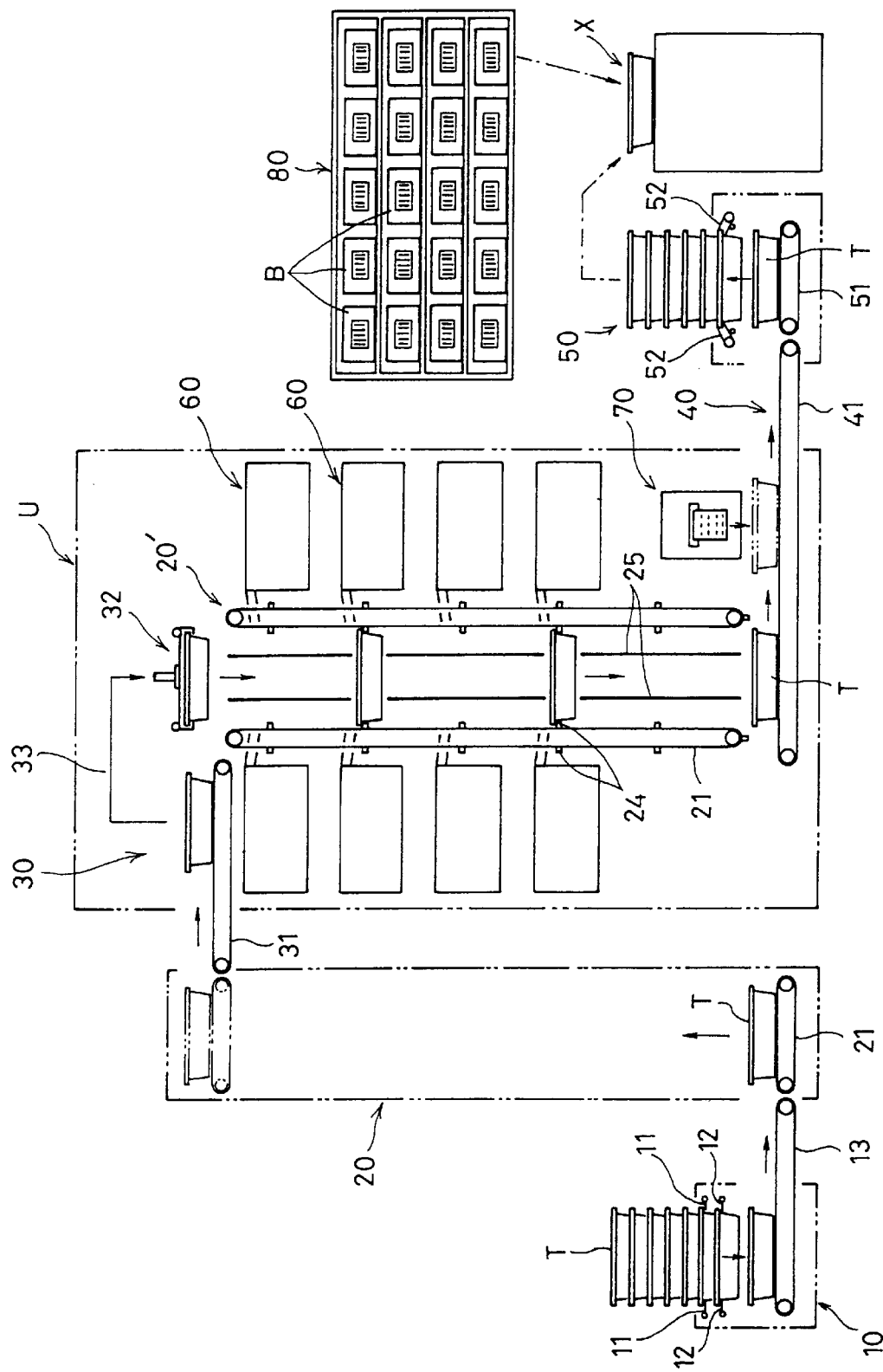
FIG. 1 is a schematic view showing a method of collecting ampules from the conveyor line including the ampule dispenser and at the drug inspection station.
Figure 2:
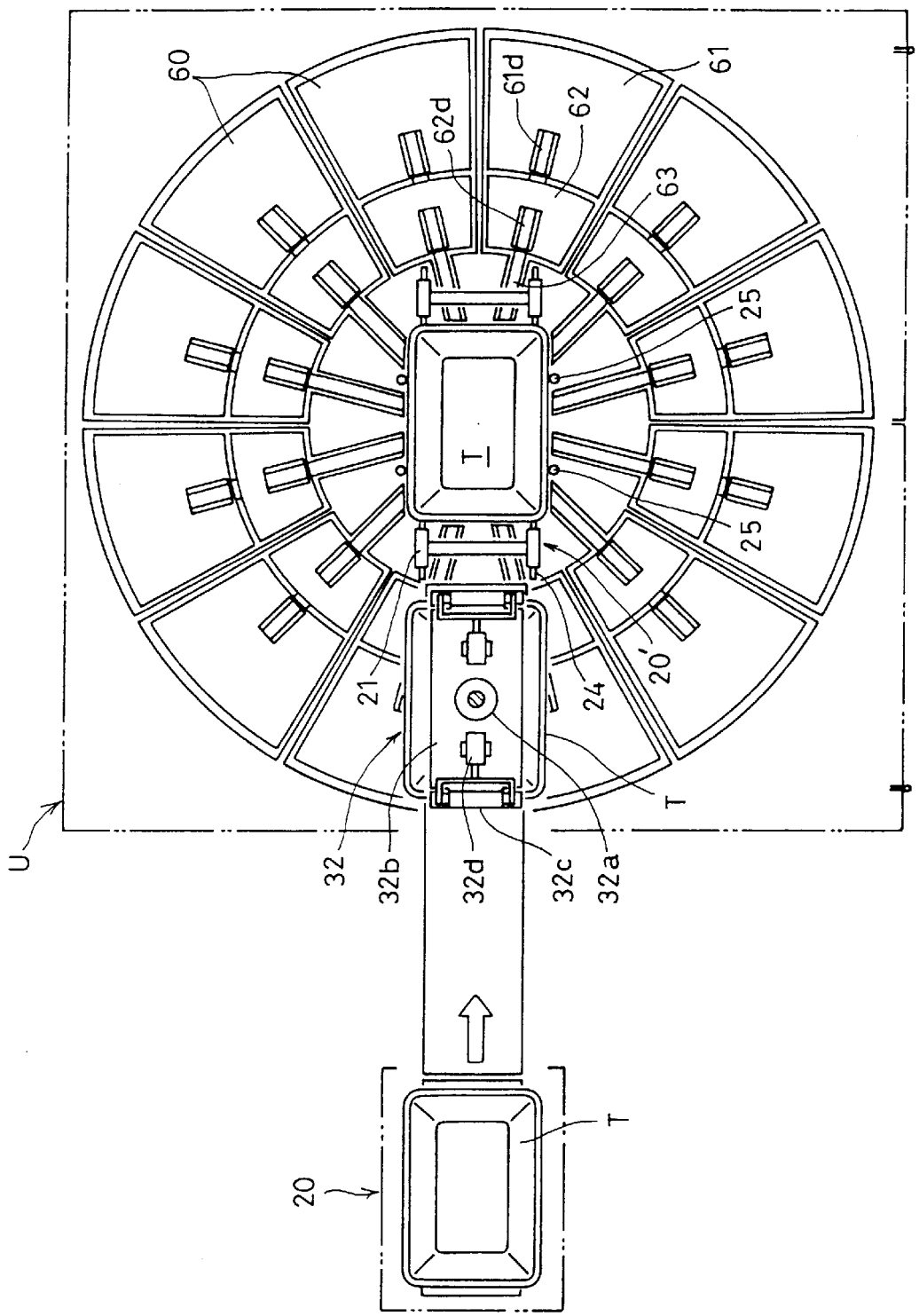
FIG. 2 is a plan view of the ampule dispenser.

FIG. 1 schematically shows the method for collecting ampules according to this invention, in conjunction with a conveyor line including an ampule dispenser U for carrying out this method. FIG. 2 is a plan view of the ampule dispenser. Trays T are raised one by one to a predetermined height by an elevator means 20, fed horizontally by a horizontal conveyor means 30, fed downward by a downward conveyor means 20' along feeders 60 arranged in vertical rows, fed to a predetermined position by a carrier unit 40, and stacked one on another by a tray stacker 50 at the delivery end of the carrier unit 40.

Since the conveyor line and the ampule dispenser shown are mere examples, their detailed illustration and description are omitted.

A tray supply unit 10 has two independently controlled rotary catches 11 and 12, and a conveyor 13. The lower catch 12 is rotated to drop the lowermost one of a plurality of stacked trays T onto the conveyor 13, while supporting the remaining trays on the upper catch 11.

Then, with the lower catch 12 rotated back to the position where it can support trays, the upper catch 11 is rotated to drop the stacked trays T onto the lower catch 12. This operation is repeated to drop trays T one by one onto the conveyor 13.

The elevator means 20 comprises a short conveyor 21 which can be raised to the predetermined height by a threaded shaft not shown. Otherwise, the conveyor 21 may be supported on a table moved up by a chain or a rod.

The horizontal conveyor means 30 comprises a conveyor 31, a tray catcher 32 for catching trays T, and a driving unit (not shown, though its mounting position is indicated by numeral 33) for moving the tray catcher 32 along an inverted U-shaped arrow. More detailed description of the tray catcher 32, as well as the downward conveyor unit 20' and the feeders 60, is made with reference to FIG. 3.

Figure 3:
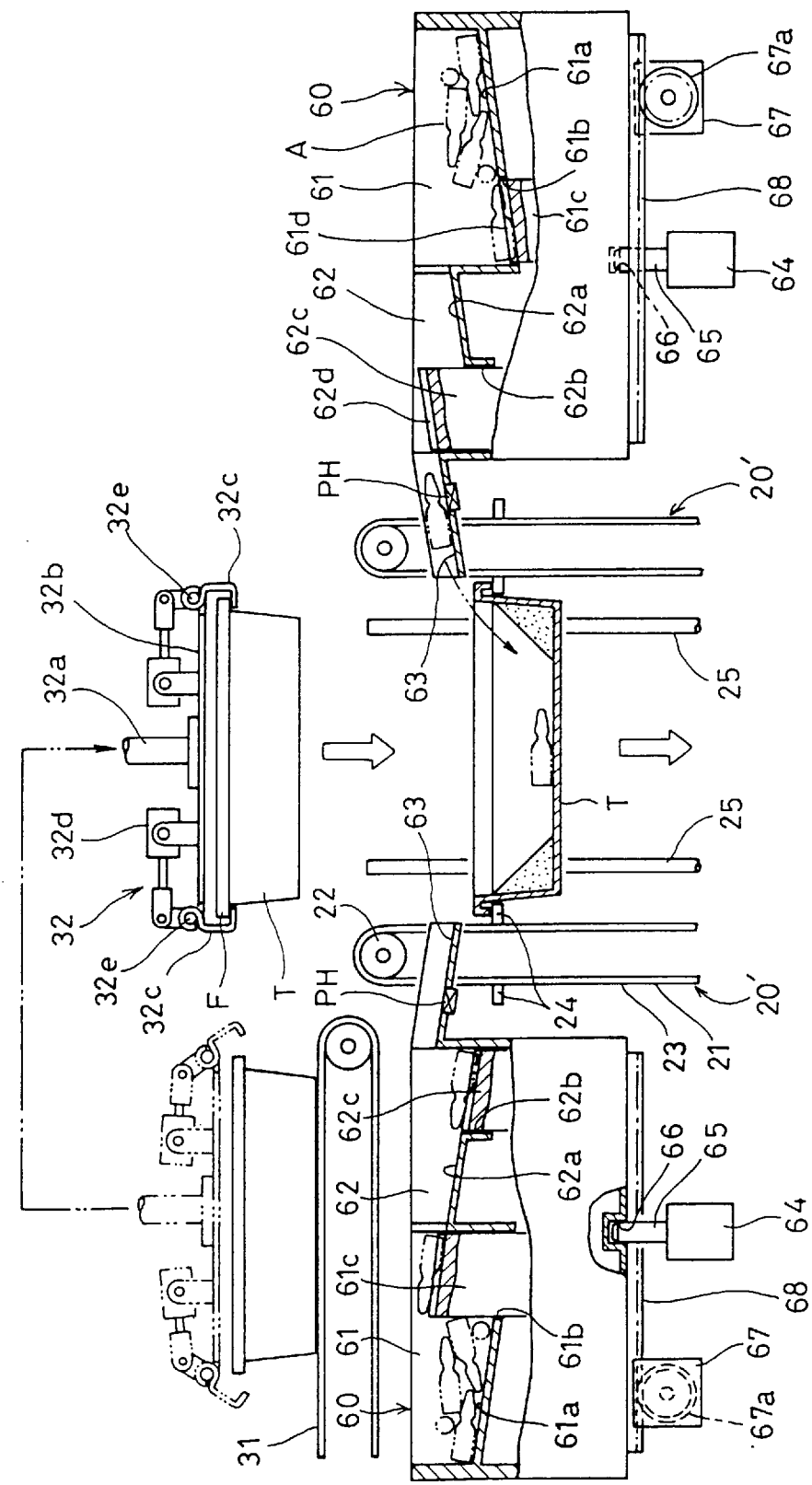
FIG. 3 is a detailed sectional side view of the dispenser of FIG. 2.

As shown in FIG. 3, the tray catcher 32 comprises a vertically movable rod 32a, a clamp plate 32b fixed to the bottom end of the rod 32a, and grippers 32c provided on both sides of the clamp plate 32b and pivoted about pins 32e by cylinders 32d supported on the clamp plate 32b.

The tray catcher 32 is reciprocated horizontally between the position where the clamp plate 32b is over the delivery end of the conveyor 31 and the position where it is over the downward conveyor unit 20'. With a tray T moved to and stopped at the delivery end of the conveyor 31, the clamp plate 32b of the tray catcher 32 is moved to right over this tray. Then, the rod 32a is lowered until the clamp plate 32b abuts the top end of the tray T, and the grippers 32c are closed to engage the top flange F of the tray T.

With the grippers 32c in engagement with the flange F, the rod 32a is raised, and then the tray catcher 32 is moved horizontally to over the downward conveyor unit 20'. In this state, the rod 32a is lowered to a predetermined position, and the grippers 32c are opened to drop the tray T.

As shown in FIG. 1, the downward conveyor unit 20' comprises a front and a rear pair of belt conveyors 21 each comprising a top and a bottom pulley 22, each pair being spaced a distance equal to the width of trays T from each other.

The belt 23 of each belt conveyor 21 has studs 24 provided at equal intervals to engage the flange F of each tray T.

Each tray T released from the tray catcher 32 is hooked on studs 24 and fed downward by the belts 23 as shown by the arrows in FIG. 3.

A plurality of feeders 60 are provided in vertical rows on either side of the feed path through which trays T are fed downward by the downward conveyor unit 20'.

Drugs A to be dispensed from the feeders 60 may be ampules, vials, tablets, capsules, etc. In the embodiments, ampules are kept in the feeders 60.

As shown in FIG. 3, each feeder has a drug container 61 and a small container 62 connected to the front end of the drug container 61. The containers 61 and 62 have bottom walls 61a and 62a both sloping downward toward the feed path of trays T. A first push-up member 61c and a second push-up member 62c vertically movably fit in holes 61b and 62b formed in the bottom walls 61a and 62a, respectively. They have top walls 61d and 62d sloping downward toward the feed path of trays and capable of supporting one drug A at a time.

With one drug A on the top wall 61d, the first push-up member 61c is pushed up. When the top member 61c aligns with the bottom wall 62a, the drug A slides down the top wall 61d into the small container 62.

Once in the small container 62, the second push-up member 62c is lowered until its top wall 62d aligns with the bottom wall 62a to let the drug A slide down onto the top wall 62d. In this state, the second push-up member 62c is pushed up until its top wall 62d aligns with the surface of a chute 63 connected to the front end of the small container 62. The drug thus slides down the inclined chute 63 and is discharged.

A sensor PH is provided along the chute 63 to detect the passage of each drug A through the chute. When the sensor PH detects the passage of a drug A, it sends a signal to stop the first and second push-up members 61c and 62c.

The drug dispenser has a controller for selecting and activating a feeder 60 that keeps necessary drugs.

Before dispensing drugs A from the selected feeder 60, the tray T sitting on the conveyor 31 at its delivery end is picked up by the tray catcher 32, carried to over the downward conveyor unit 20', dropped into the unit 20' and fed downward by the unit 20' to the position where the opening of the tray faces the chute 63 of one of the selected feeders 60.

When an unillustrated sensor finds the tray T at this position, the controller activates the feeder 60 to feed drugs A one by one into the chute 63.

Each drug slides down the inclined chute 63 and is discharged into the tray T. When a required number of drugs A have been fed through the chute 63 into the tray T, the tray T is moved down by the downward conveyor unit 20', deposited on the feed end of the carrier unit 40, and fed to the tray stacker 50 by the conveyor 41.

As shown in FIG. 1, the tray stacker 50 comprises a short conveyor 51 on which is placed a tray delivered by the conveyor 41 of the carrier unit 40, an unillustrated lift for moving up the conveyor 51, and a pair of rotary catches 52 provided at a predetemined height. The stacker 50 is installed in e.g. a hospital pharmacy. Drugs in the stacked trays are inspected at position X near the stacker.

Along the tray feed path of the carrier unit 40 is provided a printer 70 for preparing lists on necessary drugs based on prescriptions and putting them in respective trays T being fed on the conveyor. More detailed description of such lists is made below.

The conveyor line including the ampule dispenser cannot necessarily deliver all the ampules required in prescriptions. Rather, such a conveyor line cannot deliver most ampules that are not used very frequently, because it can usually store only about 200 kinds of ampules at the most, whereas there are known more than 600 kinds of ampules used in hospitals.

Ampules that cannot be prepared by the above conveyor line are usually obtained from ampule keeping boxes B set in a pharmacy shelf 80. That is, such ampules are manually taken out of predetermined boxes and put in trays T. Then, the drugs in the trays are inspected at the inspection station X.

Figure 4:
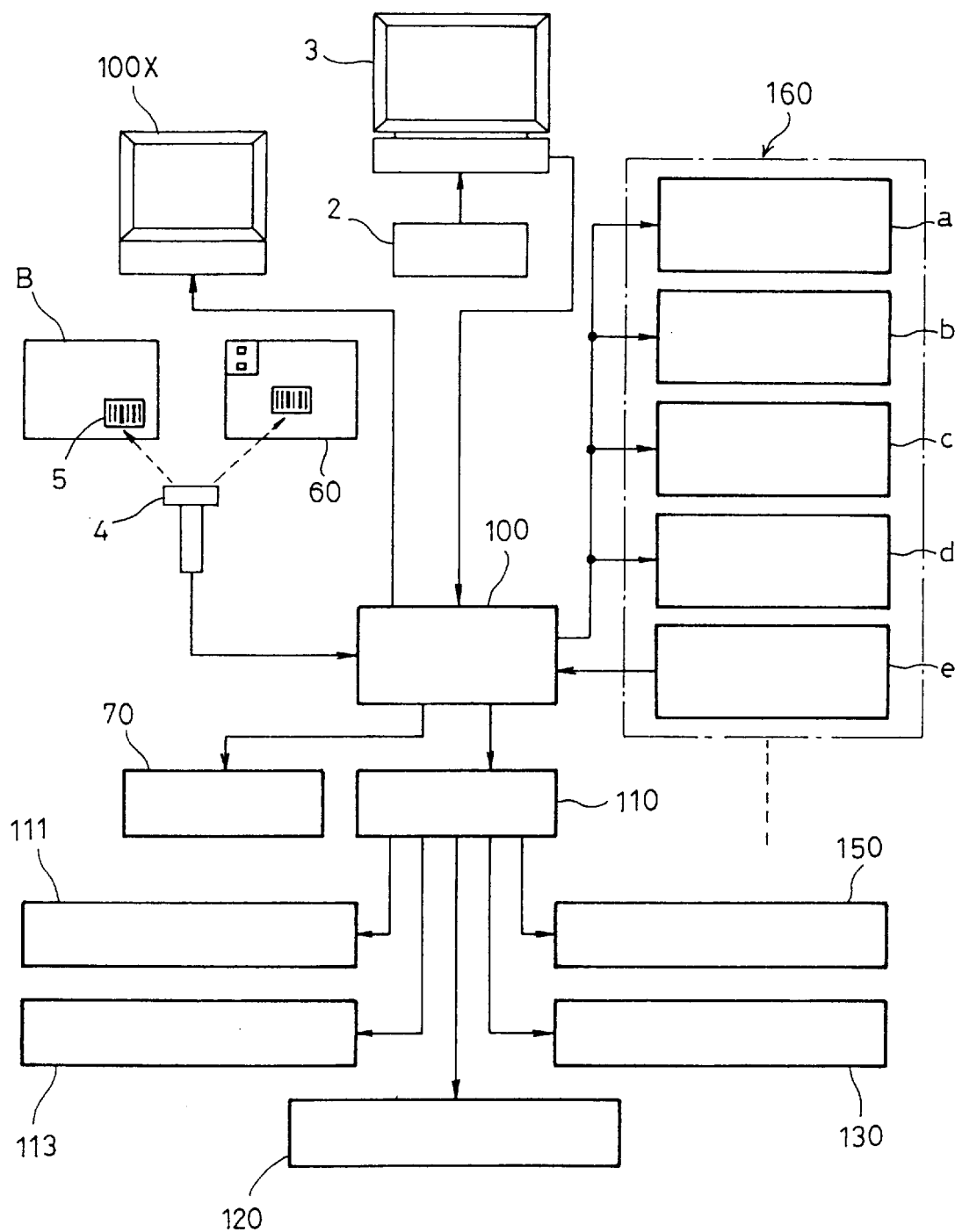
FIG. 4 a block diagram of the entire control steps of the conveyor line including the ampule dispenser.

FIG. 4 shows a block diagram of the controller for controlling the abovementioned various units. The controller includes a control unit 100 to which is connected a host computer 1 having an external input means 2 through which prescription data for each patient is inputted. The inputted prescription data is displayed on a display 3 and at the same time transferred to the control unit at predetermined intervals. The controller control the entire system based on the prescription data.

Upon receiving prescription data, the control unit 100 decides if all the necessary ampules are stored in the ampule dispenser U by reading data, such as codes, on all the ampules stored in the dispenser U from a master memory (in the control unit 100) and comparing them with the prescription data, and then dispenses the necessary ampules.

Each feeder 60 has a feeder driver 160 comprising, as shown, a display lamp a, a feeder draw-out motor b, a feeder locking means c, an ampule dispensing means d, and an ampule counter e.

When the ampules stored in the feeder 60 decreases to a predetermined number, the display lamp a is turned on, and the motor b is activated to draw out the feeder 6 in the radial direction of the drum from its normal position. After replenished with ampules, the feeder is pushed back to its normal position by the motor b and locked by the locking means c. In order to facilitate replenishment of ampules, the feeders 60 may be supported on a drum which can be rotated by a motor and can be stopped at any angular postion by pressing a button.

During a normal operation mode, the control unit 100 discharges ampules from a selected feeder 60 by activating its ampule dispensing means d and ampule counters. Specifically, ampules are discharged from the selected feeder 60 by activating its first and second push-up members 61c and 62c. The ampule counter e counts the number of ampules that have passed by the sensor PH based on the signals from the sensor PH.

The ampule dispenser U is controlled in synchronization with the tray supply unit 10, elevator means 20, horizontal conveyor means 30, downward conveyor unit 20', carrier unit 40 and tray stacker 50.

The entire system is controlled by a sequencer 110 based on commands from the control unit 100. More specifically, the sequencer controls a tray loading/unloading unit 111, carrier unit 113, elevator unit 120, feed unit 130 and tray stacking unit 150.

The tray loading/unloading unit 111 rotates the upper and lower rotary catches 11 and 12. The carrier unit 113 drives the conveyors 13 and 41 in a timely manner. The elevator unit 120 controls the elevator means 20 and the downward conveyor unit 20' to move trays T up and down, respectively. The feed unit 130 controls drive units (not shown) to move the conveyor 31 and the tray catcher in the directions indicated by arrows.

The tray stacking unit 150 controls the conveyor 51, the unillustrated lift and the pair of rotary catches of the tray stacker 50. The printer 70 is controlled directly by the control unit 100.

A bar code reader 4 is provided to read bar codes 5 on each box B keeping ampules that have to be manually collected, and bar codes on boxes (not shown) keeping ampules for replenishment.

As mentioned earlier, the conveyor line including the ampule dispenser U can store only about 200 kinds of ampules in spite of the fact that there are more than 600 kinds of ampules being used in hospitals. Thus, it is often impossible to collect some of the required ampules from the conveyor line. In such a case, only the ampules which can be collected from the conveyor line is put in a tray T, and the tray is fed to the delivery end of the feed line and stacked by the tray stacker 50.

In this embodiment, a check list is put in each tray stacked by the stacker. Thus, by checking the list, a pharmacist can instantly see which of the necessary ampules are not in the tray and can collect such missing ampules from a corresponding box B on the shelf B before the inspection step at the inspection station X.

As shown in FIG. 5A, each check list carries all the drug names to be prescribed for each patient. Of these, the drug names that have not been collected in the tray are highlighted by e.g., hatching as shown in FIG. 5B so that a pharmacist can easily tell drugs that have not yet been collected from those already in the tray.

Since the drugs that are not in the tray are highlighted on the list, a pharmacist can instantly see which drugs to collect from the shelf 80 without taking the trouble of comparing the check list with the drugs in the tray. Thus, drugs can be collected with high efficiency.

Missing drug names may be highlighted not by hatching but by any other means, e.g., by marks such as ·X· affixed to the left end of each missing drug names, or by printing only missing drug names in color, or by cross-hatching.

FIG. 6 shows a different type of check list to be put in each tray. This list consists of two sheets of paper, one sheet, shown in FIG. 6A, carrying drug names that have already been collected in the tray, and the other sheet, shown in FIG. 6B, carrying drug names that have not yet been collected. A pharmacist only checks the latter sheet and collects all the drugs listed from the shelf 80. It is thus possible to reduce the possibility of mistakes still further.

As described above, according to this invention, a list carrying names or codes of all the drugs that have to be collected in a tray is prepared and put in the tray. Of these drug names or codes, those of the drugs that cannot be collected from the ampule dispenser are highlighted. Thus, a pharmacist can instantly see which drugs are not in the tray without the need to compare the prescription data with the drugs actually in the tray. Thus, the drug inspection step can be carried out efficiently.

In the second invention, the list comprises a first sheet carrying the names or codes of the drugs already in the tray, and a second sheet separate from the first sheet and carrying the names or codes of the drugs not in the tray. In this case, a pharmacist collects the drugs listed on the second sheet. Thus, it is possible to further improve working efficiency.

What is claimed is:

1. An apparatus for collecting ampuled drugs comprising:

a conveyor means for transporting drug containers;

an ampule dispenser for storing a plurality of kinds of ampuled drugs and dispensing, in response to a command based on prescription data, predetermined numbers of ampuled drugs of predetermined kinds into said drug containers which have been fed on said conveyor means;

a printer means for creating check lists by printing names or codes of drugs collected in said respective drug containers by said ampule dispenser, and names or codes of other drugs that have not been collected from said ampule dispenser but are specified in the prescription data, and putting the check lists thus created into said respective containers, said names or codes of said other drugs being highlighted so as to be distinguished from the names or codes of the drugs already in said drug containers; and a container stacker comprising an elevator means provided at a delivery end of said conveyor means and vertically movable between a first position at the same level as said delivery end and a second position over said first position, a driving means for moving said elevator means between said first and second positions, and an engaging means provided near said second position and adapted to engage said drug container on said elevator means when said elevator means rises to said second position so that said drug container is kept engaged even when said elevator means is lowered but can move further upward when said drug container is pushed up by a next one of said drug container placed on said elevator means.

\* \* \* \* \*